United States Patent [19]

Kim et al.

[11] Patent Number: 5,598,277
[45] Date of Patent: Jan. 28, 1997

[54] METHOD OF CORRECTING ERRORS IN DIGITAL VCR WITH HORIZONTAL AND VERTICAL DETECTION AND CORRECTION

[75] Inventors: Sang W. Kim; Seung H. Kim, both of Daejon; Chi S. Won, Kyungki-Do, all of Rep. of Korea

[73] Assignee: Goldstar Co., Ltd., Seoul, Rep. of Korea

[21] Appl. No.: 89,887

[22] Filed: Jul. 12, 1993

[30] Foreign Application Priority Data

Jul. 16, 1992 [KR] Rep. of Korea ............. 12760/1992

[51] Int. Cl.$^6$ .................................................. H04N 5/94
[52] U.S. Cl. ....................................................... 386/116
[58] Field of Search ............................ 358/335, 337, 358/320, 336, 314, 340, 339; 360/32, 38.1; 371/37, 38, 39, 40; 348/616; H04N 5/94

[56] References Cited

U.S. PATENT DOCUMENTS 4,577,237 3/1986 Collins ................... 358/336
4,726,028 2/1988 Himeno ................... 371/37.7
4,829,525 5/1989 Sugiyama ................ 371/37.7

*Primary Examiner*—Tommy P. Chin
*Assistant Examiner*—Huy Nguyen
*Attorney, Agent, or Firm*—Fliesler, Dubb, Meyer & Lovejoy

[57] ABSTRACT

A method of correcting errors in a digital VCR in which the error correcting capability is maximized and probabilities that no error is detected and data decoding fails are minimized, by using a relatively small length of redundancy. The method comprises the first step of detecting errors from vertical and horizontal sections of a code of data played back from a tape and setting cross-points of the detected errors to flags, the second step of detecting errors from the horizontal code sections of the played back data, correcting the detected errors and erasing only the errors positioned at the cross-points set to the flags at the first steep, in ones of the horizontal code sections from which detectable but non-correctable errors are detected, and the third step of correcting the errors erased at the second in a vertical direction.

1 Claim, 4 Drawing Sheets

ENCODING DIRECTION

DECODING DIRECTION

METHOD OF CORRECTING ERRORS IN DIGITAL VCR WITH HORIZONTAL AND VERTICAL DETECTION AND CORRECTION

BACKGROUND OF THE INVENTION

1. Field of the Invention

The present invention relates in general to digital video cassette recorders, and more particularly to a method of correcting errors in a digital video cassette recorder (VCR) in which the error correcting capability is maximized and probabilities that no error is detected and data decoding fails are minimized.

2. Description of the Prior Art

It is common that an error correcting coder is used in a digital VCR to correct errors occurring in compressing data to record it or decoding the recorded data. In the error correcting coder, there have generally been used block codes or convolutional codes. In particular, the block codes have more widely been used in the digital VCR than the convolutional codes.

In a reed solomon (RS) code as one of the block codes, there are present a part designating input data and a part designating a redundancy. Here, the capability of detecting and correcting the errors is dependent on the redundancy.

In order to maximize the capability of correcting the errors of the data recorded on a tape, it is preferred to use the reed solomon code with a two-dimensional structure as shown in FIG. 1 rather than a one-dimensional structure of a block unit.

Referring to FIG. 2, there is shown a block diagram of a conventional reed solomon coder with the two-dimensional structure. As shown in this drawing, the conventional reed solomon coder comprises a vertical encoder 1 for encoding input data Din in a vertical direction and storing the encoded data in a first memory 2, a horizontal encoder 3 for encoding the data stored in the first memory 2 in a horizontal direction and recording the encoded data on a tape 4, and a horizontal decoder 5 for decoding data played back from the tape 4 in the horizontal direction and storing the decoded data in a second memory 6. The horizontal decoder 5 is adapted to detect errors from the data played back from the tape 4 and correct the detected errors. Also, the horizontal decoder 5 serves to erase all horizontal code sections of the data from which detectable but non-correctable errors are detected.

The conventional reed solomon coder also comprises a second memory 6 for storing output data from the horizontal decoder, and a vertical decoder 7 for decoding the data stored in the second memory 6 in the vertical direction and correcting the data code sections erased in the horizontal direction by the horizontal decoder 5 in the vertical direction.

FIG. 3 is a flowchart illustrating a conventional method of detecting and correcting the errors of the data recorded on the tape in FIG. 2.

The operation of the conventional reed solomon coder with the above-mentioned construction will hereinafter be described with reference to FIG. 3.

In operation, the input data Din is encoded in the vertical direction by the vertical encoder 1 and then stored in the first memory 2. Then, the data stored in the first memory 2 is encoded in the horizontal direction by the horizontal encoder 3 and then recorded on the tape 4.

Here, the errors occurring in the data which is recorded on the tape in the above manner are detected and corrected by the horizontal decoder 5 and the vertical decoder 7 as shown in FIG. 3. First, the horizontal decoder 5 detects the horizontally occurring errors from the data recorded on the tape 4 and corrects the detected errors. Also, the horizontal decoder 5 erases all the horizontal code sections of the data from which the detectable but non-correctable errors are detected. Thereafter, the vertical decoder 7 corrects the data code sections erased in the horizontal direction by the horizontal decoder 5 in the vertical direction.

In the reed solomon code (n1,k1) of the two-dimensional structure, provided that the total length of a code word is n1, a length of a redundancy constituting a portion of the code word is n1-k1, the number of the errors to be corrected is Ec and the number of the errors to be detected is Ed, the error detection and correction can performed within the range of the following equation:

$$Ec+Ed<n-k$$

Namely, the correction is made possible for the errors of the number smaller than or equal to Ec, but impossible for the errors of the number greater than Ec. The detection is made possible for the errors of the number smaller than or equal to Ed, but impossible for the errors of the number greater than Ec. Also, the horizontal code sections of the data from which the detectable but non-correctable errors are detected are all erased.

In the reed solomon code (n2,k2) of the two-dimensional structure, where n2 is the total length of a code word and n2-k2 is a length of a redundancy constituting a portion of the code word, the data code sections erased in the horizontal direction are corrected in the vertical direction by the vertical decoder 7. Namely, assuming that the number of the vertically existing errors of the data recorded on the tape 4 is t1 and the number of the data sections erased by the horizontal decoder 5 is t2, the error detection and correction can performed within the range of the following equation:

$$t1+2t2<n2-k2$$

Noticeably, the data sections erased by the horizontal decoder 5 are given the correction capability twice as much as the errors with no position information.

However, the conventional reed solomon coder has a disadvantage in that the horizontal code sections of the data from which the detectable but non-correctable errors are detected are all erased and then corrected in the vertical direction. Namely, when no error is detected from the horizontal code sections of the data, the error correction is made impossible and the non-corrected errors exert a bad influence on a picture quality. Also, because the horizontal code sections of the data from which the detectable but non-correctable errors are detected are all erased, even data sections with no error are erased, resulting in a loss in the information. The information loss means that the errors to be corrected by the vertical decoder is increased in number. Further, the errors which cannot be corrected by the vertical decoder are applied to an error concealment unit, which corrects the surrounding values into estimated values. In this case, an increase in the number of the errors being applied to the error concealment unit results in a degradation in the picture quality.

SUMMARY OF THE INVENTION

Therefore, the present invention has been made in view of the above problems, and it is an object of the present invention to provide a method of correcting errors in a digital VCR in which the error correcting capability is maximized and probabilities that no error is detected and data decoding fails are minimized, by using a relatively small length of redundancy.

In accordance with the present invention, the above and other objects can be accomplished by a provision of a method of correcting errors in a digital VCR, comprising the steps of: (a) detecting errors from vertical and horizontal sections of a code of data played back from a tape and setting cross-points of the detected errors to flags; (b) detecting errors from the horizontal code sections of the played back data, correcting the detected errors and erasing only the errors positioned at the cross-points set to the flags at the step (a), in ones of the horizontal code sections from which detectable but non-correctable errors are detected; and (c) correcting the errors erased at the step (b) in a vertical direction.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
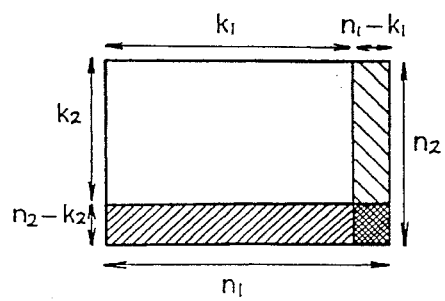
FIG. 1 is a sectional view illustrating a general reed solomon code with a two-dimensional structure.
Figure 2:
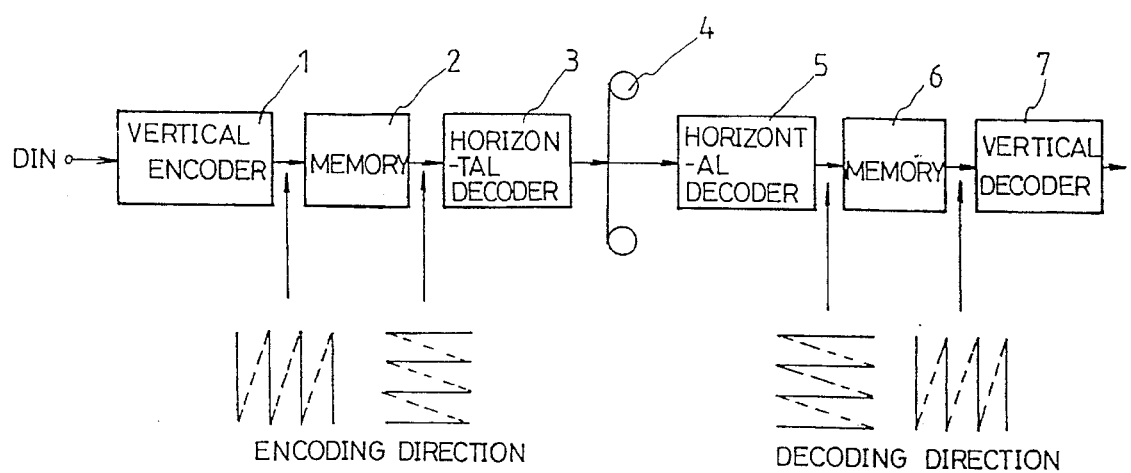
FIG. 2 is a block diagram of a conventional reed solomon coder with the two-dimensional structure.
Figure 3:
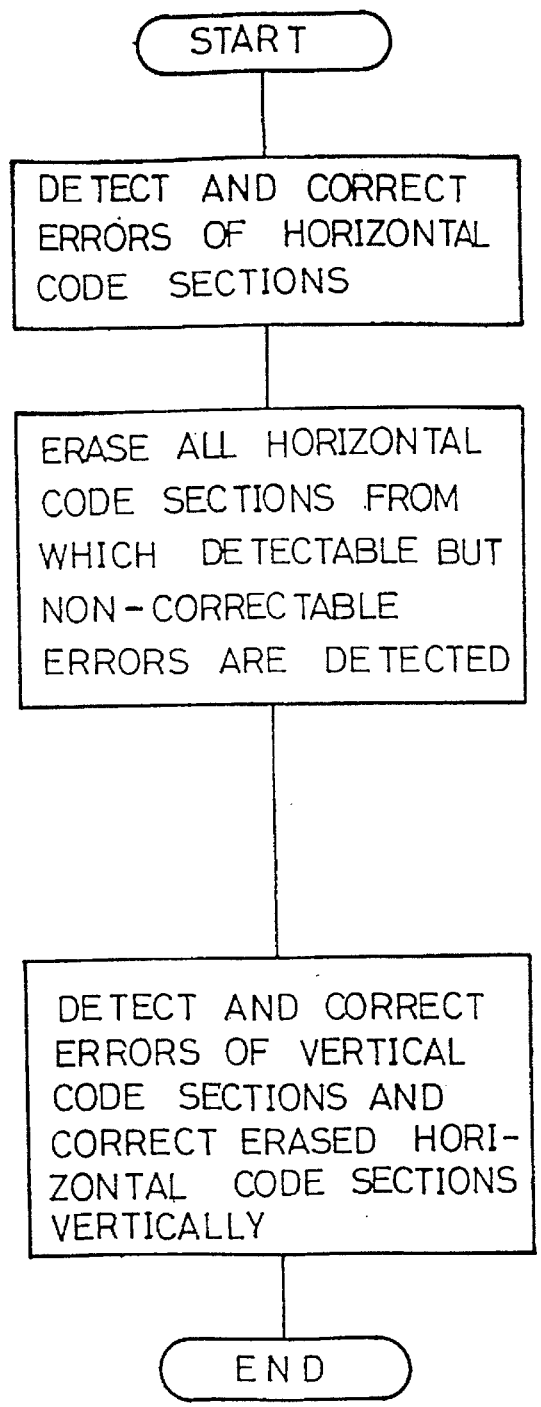
FIG. 3 is a flowchart illustrating a conventional method of correcting errors in the conventional reed solomon coder in FIG. 2.
Figure 4:
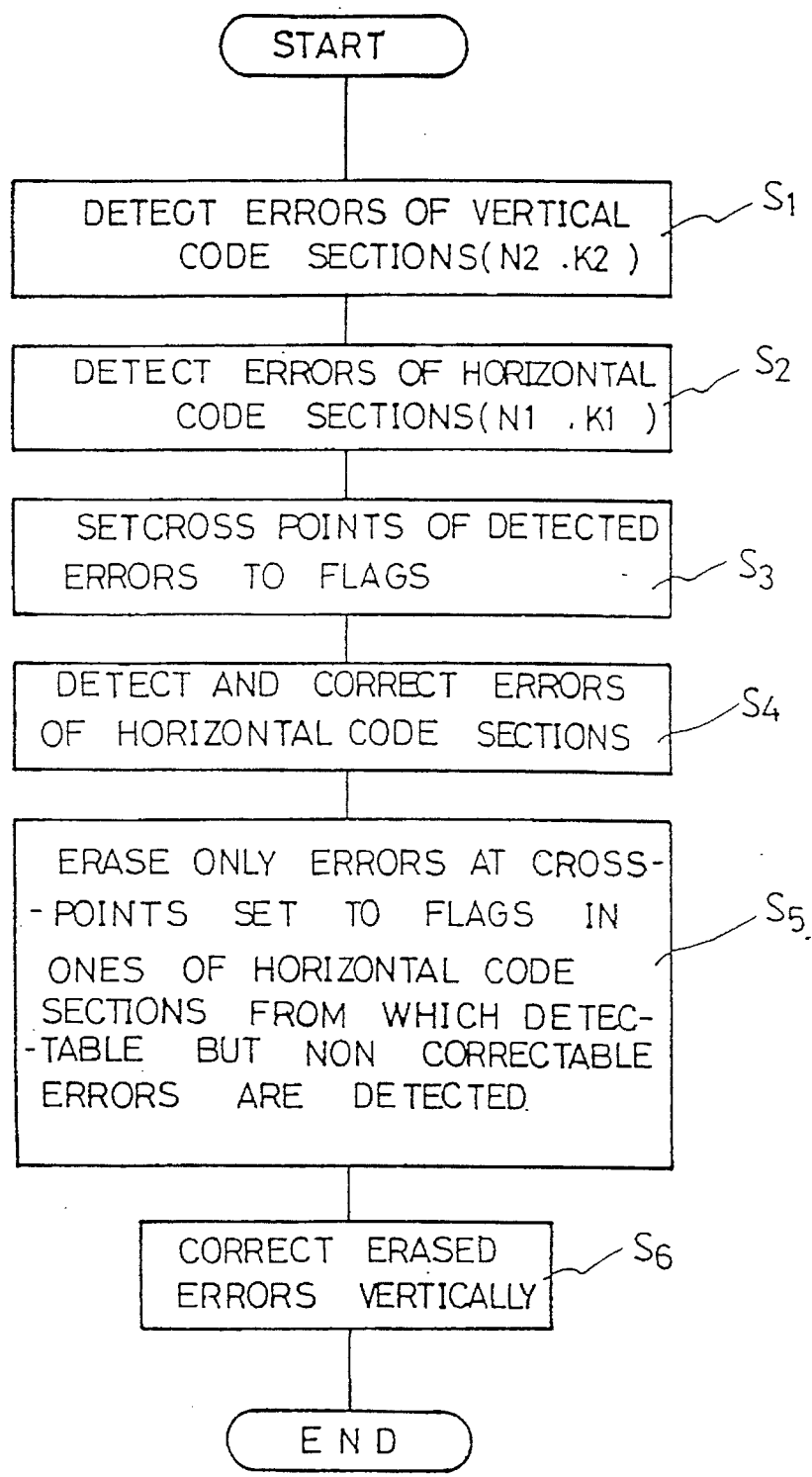
FIG. 4 is a flowchart illustrating a method of correcting errors in a reed solomon coder with a two-dimensional structure in accordance with the present invention.

Referring to FIG. FIG. 4, there is shown a flowchart illustrating a method of correcting errors in a reed solomon coder with a two-dimensional structure in accordance with the present invention. As shown in this drawing, the error correcting method of the present invention comprises the first step (S1–S3) of detecting errors from vertical and horizontal sections of a code of data recorded on a tape and setting cross-points of the detected errors to flags, the second step (S4 and S5) of, through a horizontal decoder, detecting errors from the horizontal code sections of the data, correcting the detected errors and erasing only the errors positioned at the cross-points set to the flags at the first step, in ones of the horizontal code sections from which detectable but non-correctable errors are detected and the third step (S6) of correcting the errors erased at the second step in a vertical direction through a vertical decoder.

Figure 5:
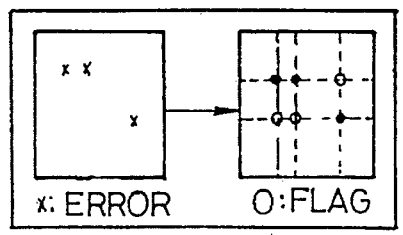
FIG. 5 is a view illustrating the first step of detecting errors in the method in FIG. 4.

The error correcting method which is performed in the above-mentioned manner in accordance with the present invention will hereinafter be described in detail with reference to FIGS. 4 to 6.

As shown in FIG. 4, at the step S1, errors are detected from the vertical code sections of the data recorded on the tape. Also, errors are detected from the horizontal code sections of the data recorded on the tape at the step S2. Then, at the step S3, cross-points of the errors detected at the steps S1 and S2 are set to the flags as shown in FIG. 5. Namely, when the number of the errors detected at the step S1 is smaller than or equal to n2-k2 in the code (n2,k2), the errors are detected from the vertical code sections. Also, when the number of the errors detected at the step S2 is smaller than or equal to n1-k1 in the code (n1,k1), the errors are detected from the horizontal code sections.

Noticeably, the redundancy constituting a portion of the data code word may be used as a parity for the error detection and correction. Here, since the parities for the error detection and correction are all used only to detect the errors, the probability Pud of detecting the errors are high as shown in FIG. 6.

On the other hand, at the step S4, errors are detected from the horizontal code sections of the data and then corrected. At the step S5, in ones of the horizontal code sections from which the detectable but non-correctable errors are detected, there are erased only the errors positioned at the cross-points set to the flags at the step S3. The errors erased at the step S5 are corrected in the vertical direction through the vertical decoder at the step S6.

The errors which cannot be corrected at the step S6 are applied to an error concealment unit, which corrects the surrounding values into estimated values.

As mentioned above, because only the errors of the horizontal code sections erased at the step S5 are corrected by the vertical decoder, the number of the errors to be corrected by the vertical decoder and an amount of the data to be decoded by the vertical decoder are small. Therefore, the probability that the data decoding fails is low. Also, since the errors to be corrected by the vertical decoder are small in number, the errors being applied to the error concealment unit are small in number. This results in improvement in the picture quality.

Figure 6:
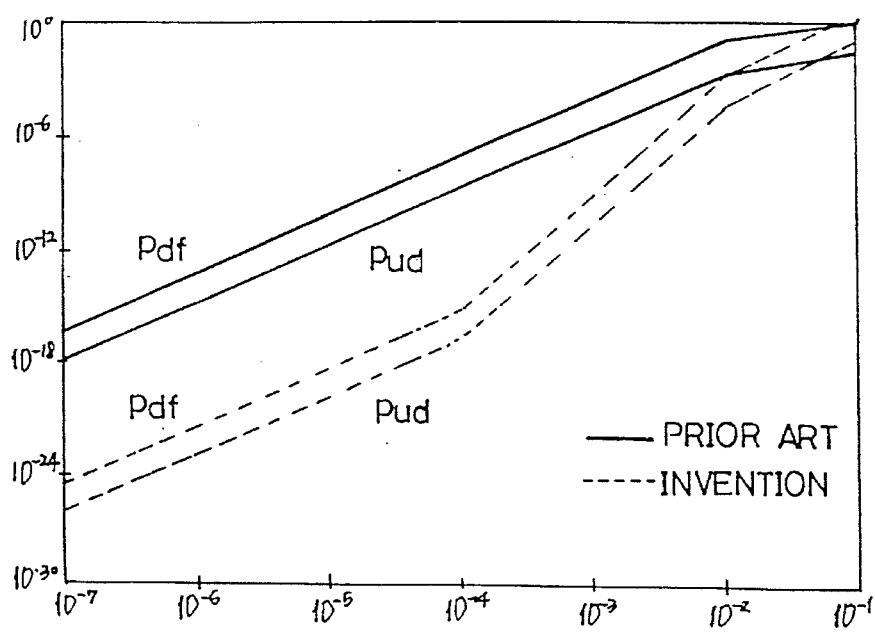
FIG. 6 is a graph comparing the present invention with the prior art with respect to probabilities that no error is detected and data decoding fails.

FIG. 6 is a graph comparing the present invention with the prior art with respect to the probabilities Pud and Pdf that no error is detected and the data decoding fails. It can be seen from this drawing that the error correcting method of the present invention provides the probabilities Pud and Pdf lower than those in the prior art.

As hereinbefore described, according to the present invention, the errors are detected from the vertical and horizontal code sections of the data played back from the tape before the data is decoded vertically and horizontally, the cross-points of the detected errors are set to the flags and only the errors positioned at the cross-points are corrected, This has the effect of preventing a loss in the information with no error and reducing the number of the errors to be corrected by the vertical decoder. Therefore, the probabilities that no error is detected and the data decoding fails become low.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of correcting errors in a digital VCR comprising:

a vertical detection stop for detecting errors from vertical coded sections of played back data from a tape;

a horizontal detection step for detecting errors from horizontal coded sections of played back data from the tape;

a flag-setting step for setting flags at cross-points of the detected error in said vertical and horizontal coded sections of the played back data;

a horizontal correction step for correcting the detected errors positioned at the cross-points having the flags set;

an error erasure step for erasing in ones of the horizontal coded sections from which detectable but non-correctable errors are detected only those of the errors positioned at the cross-points having flags set; and a vertical correction step for correcting in a vertical direction the errors erased in said error erasure step.

* * * * *